Feb. 11, 1969     D. E. MILLER     3,427,656
BEARING
Filed Jan. 19, 1966
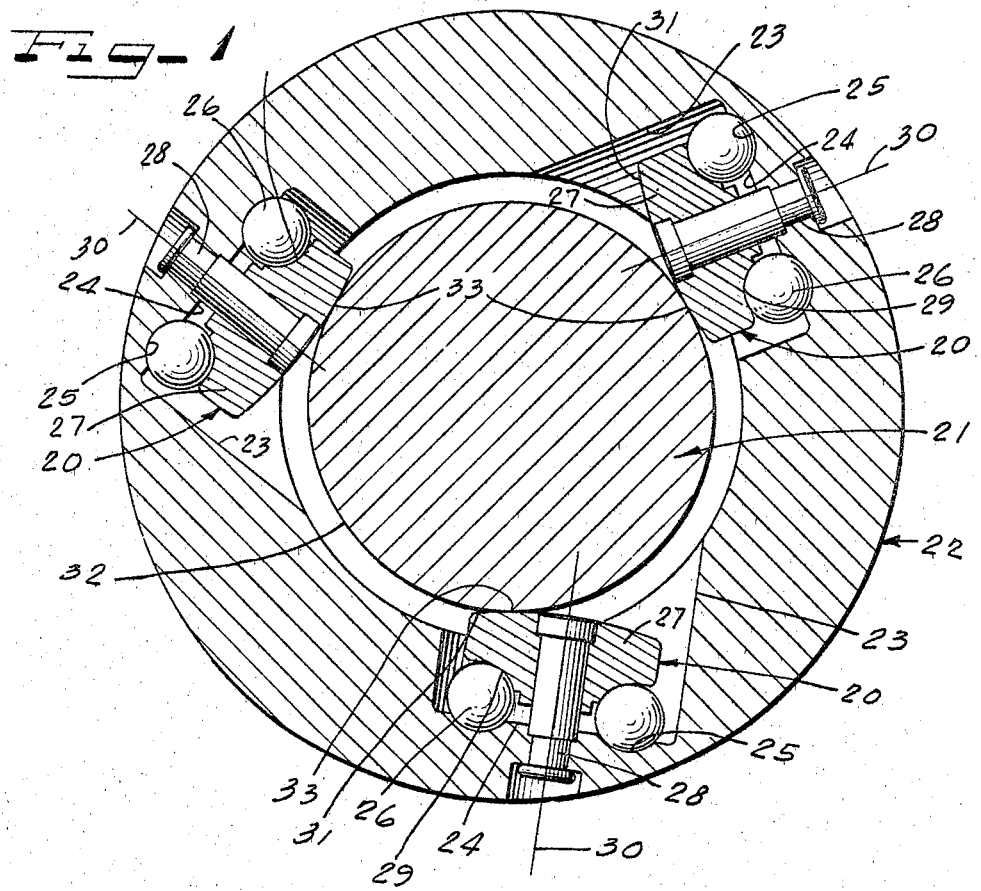
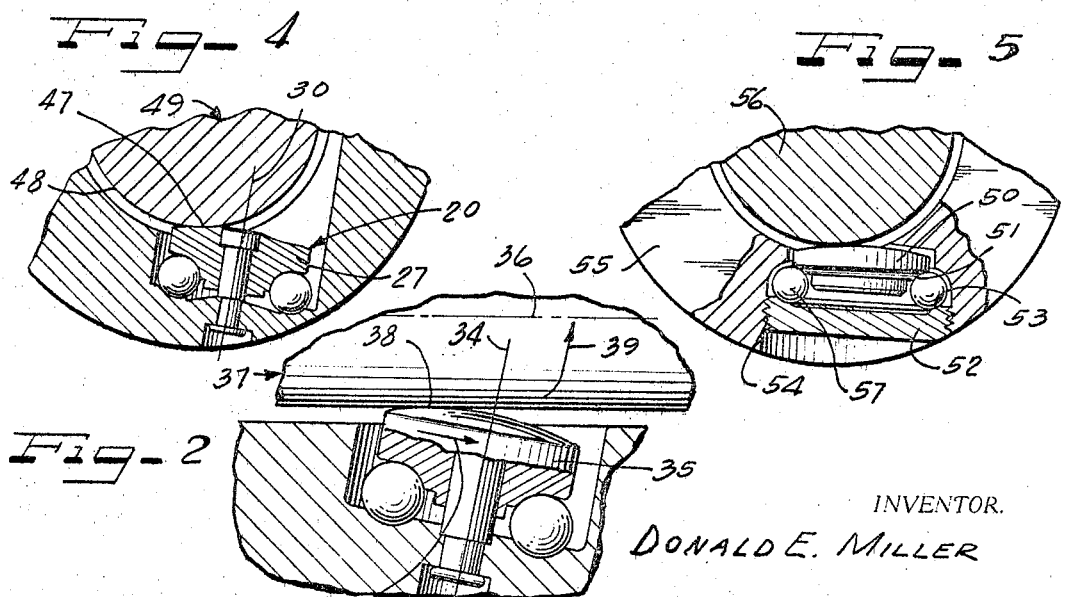
INVENTOR.
DONALD E. MILLER Feb. 11, 1969     D. E. MILLER     3,427,656
BEARING
Filed Jan. 19, 1966     Sheet 2 of 3
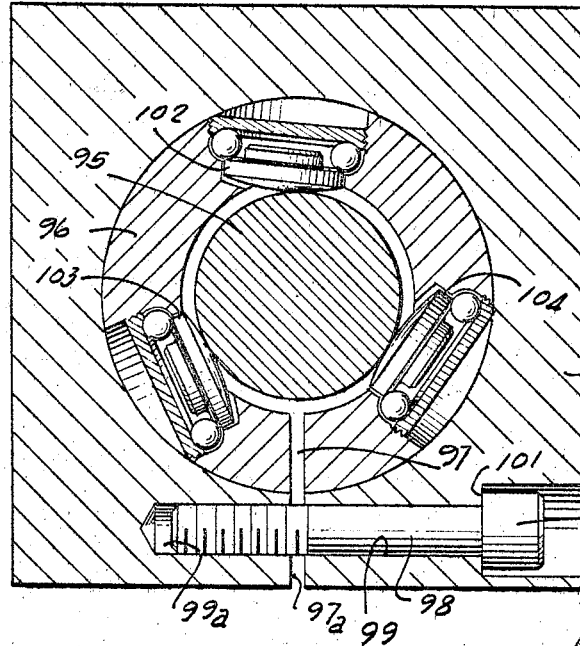
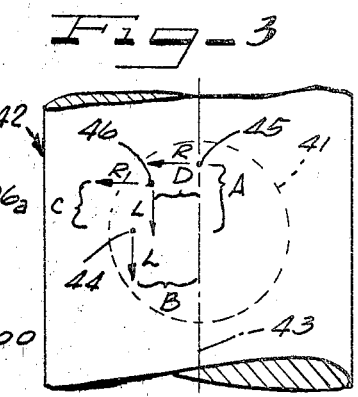
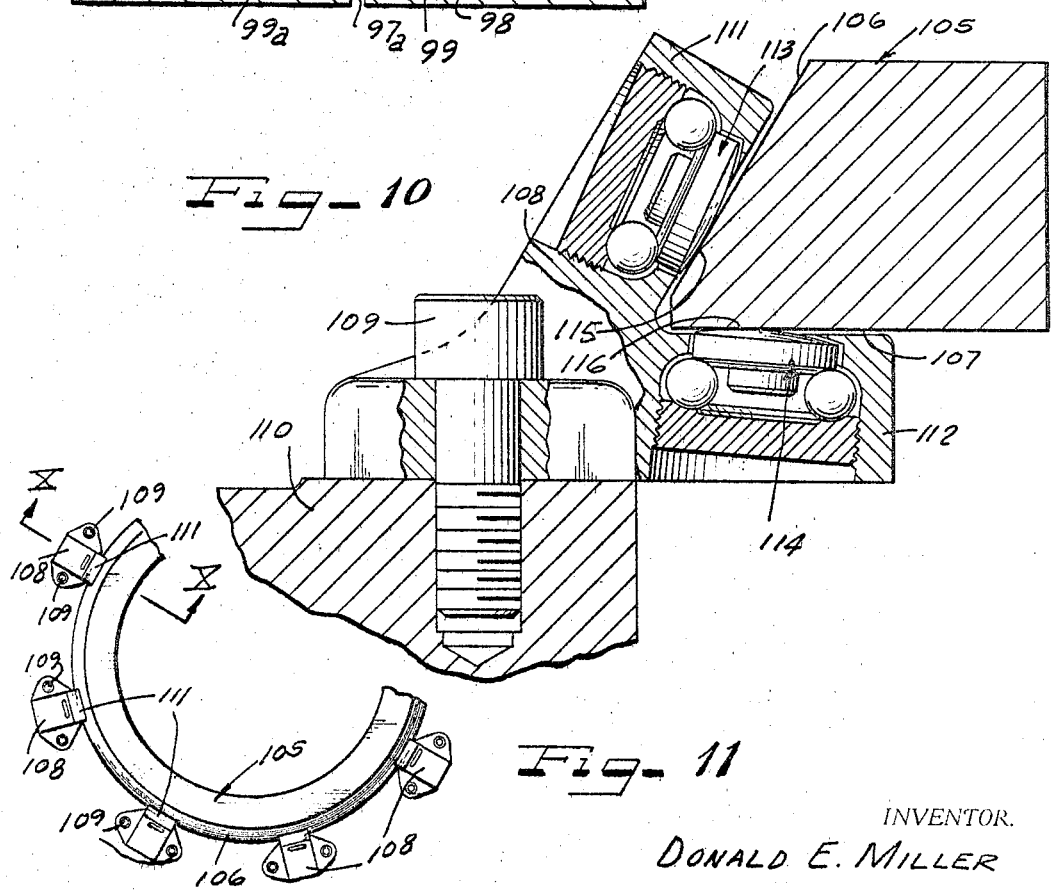
INVENTOR.
DONALD E. MILLER

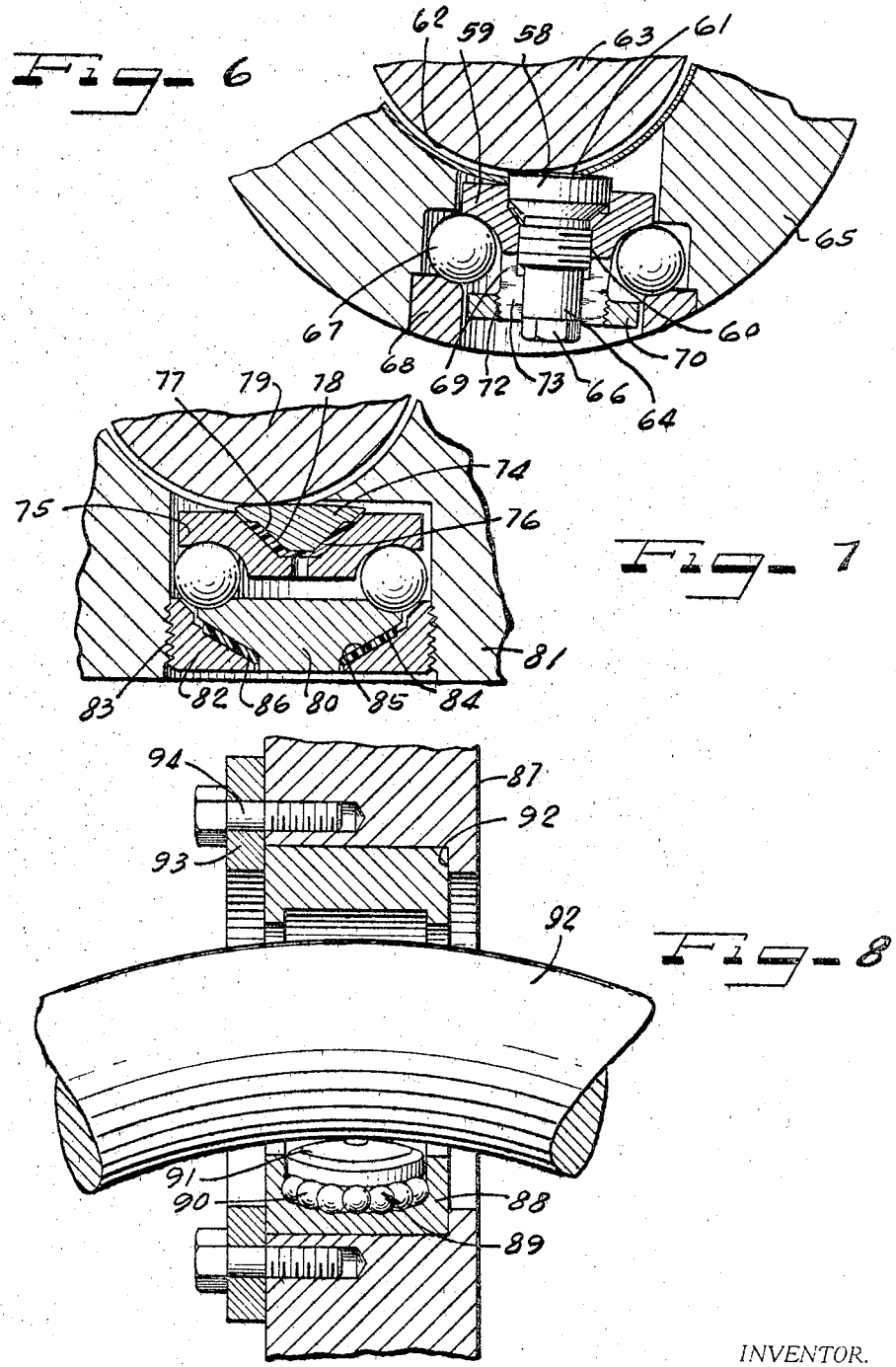

United States Patent Office 3,427,656
Patented Feb. 11, 1969

3,427,656
BEARING
Donald E. Miller, 102 E. Hiawatha,
Mount Prospect, Ill. 60056
Filed Jan. 19, 1966, Ser. No. 521,616
U.S. Cl. 308—6
Int. Cl. F16c *17/00, 19/00, 21/00*
12 Claims

ABSTRACT OF THE DISCLOSURE

This invention relates to a linear motion bearing assembly and more particularly relates to a bearing rotary disc element for making an off-center contact with a linearly moving shaft and for providing an increased bearing load capacity while accommodating both static and dynamic misalignment of the shaft.

---

Current linear motion bearings generally consist of a plurality of bearing elements which act along an appreciable length of a longitudinally movable shaft. As the bearing elements are maintained directly against the surface of the shaft, slight misalignment of the shaft significantly increases the bearing load. It is apparent that irregularly shaped or warped shafts cannot be accommodated by this type of bearing support.

A principal reason for employing a plurality of bearing elements, either of the ball or roller type, along an appreciable length of the shaft is simply because a plurality of elements are necessary to sustain the shaft loading. This is especially true in view of the fact that such bearing elements tend to have relatively small radii of curvature at the point of contact with the shaft resulting in high contact stresses. All commercially marketed linear bearings except ball bushings are difficult to apply and seal, and nearly all use small rolling elements.

Therefore, it is a principal object of this invention to provide a linear motion bearing assembly having increased loading capacity per unit and being capable of accommodating substantial misalignment of the longitudinally movable shaft.

It is another object of this invention to provide an antifriction bearing for linear motion applications which is convenient to install and seal and which has increased longevity and which has a realtively large radius of curvature at the point of contact with a moving shaft.

It is another object of this invention to provide a linear motion bearing assembly having an increased loading capacity and being capable of operating with shafts which are sufficiently soft to be machined.

A further object of this invention is to provide a linear motion bearing assembly capable of supporting curvilinear shafts.

It is also an object of this invention to provide a linear motion bearing assembly which comprises a bearing rotary disc element for making an off-center contact with a linearly moving shaft.

It is another object of this invention to provide an antifriction bearing assembly of the rotary disc element type which can accommodate both rotary and linear shaft motions.

It is an additional object of this invention to provide an anti-friction bearing assembly of the rotary disc element type which can be aligned and pre-loaded at installation within a shaft housing.

It is another object of this invention to provide a rotary disc type bearing element having internal resilience for automatically accommodating variations in the alignment and in the diameter of the relatively movable shaft.

These and other objects, features and advantages of the present invention will be understood in greater detail from the following description and the associated drawings wherein reference numerals are utilized in designating illustrative embodiments and wherein:

FIGURE 1 is a sectional view of a shaft and associated housing illustrating the structure and operation of a rotary disc bearing element of this invention as used for wholly linear shaft movements;

FIGURE 2 is a sectional view of a shaft and associated housing showing a rotary disc-bearing element as used for wholly rotary movements of the shaft;

FIGURE 3 is a diagrammatic representation showing a shaft and an associated rotary disc-bearing element and illustrating the required contact conditions for wholly linear, wholly rotary, and combined rotary and linear motions of the shaft;

FIGURE 4 is a sectional view of a shaft and associated rotary disc-bearing element illustrating an alternate embodiment for the disc contact member of that element;

FIGURE 5 is a sectional view of a shaft and associated housing similar to the view of FIGURE 1 and showing a further alternate embodiment of the rotary disc-bearing element;

FIGURE 6 is a partial sectional view similar to the views of FIGURES 1 and 5 showing an alternate rotary disc bearing element having an adjustable loading contact member;

FIGURE 7 is a sectional view similar to FIGURE 6 showing a rotary disc-bearing element having internal resiliency for accommodating variations in the shaft diameter and alignment;

FIGURE 8 is a sectional view of a support housing utilizing a rotary disc-bearing element of this invention and illustrating the opeartion of that element in conjunction with a curvilinear shaft;

FIGURE 9 is a further view of a shaft and associated housing utilizing rotary disc-bearing elements of this invention and employing a means for adjustably loading the elements against the associated shaft;

FIGURE 10 is a sectional view of a flange block having discrete support arms employing rotary disc-bearing elements of this invention for supporting both rotary and linear motions of irregularly shaped shaft-like members; and FIGURE 11 is a top view of a ring or turntable being supported by a plurality of flange block structures employing the rotary disc-bearing elements of this invention as shown in FIGURE 10.

As shown on the drawings:

Generally this invention concerns the use of a bearing disc having a selectable radius of curvature which is mounted for rotation on a series of bearing elements such as ball or roller type bearings. The bearing disc is maintained in contact with a movable shaft or the like at a point which is removed from the axis of the disc. In this way, the movement of the shaft produces a torque about the disc axis for rotating the disc on the ball or roller type support bearings.

Referring to the drawings in greater detail, FIGURE 1 shows a rotary disc-bearing element 20 disposed in a cooperable bearing relationship with a shaft 21. The bearing 20 consists in part of a housing 22 which has an obliquely formed depression 23. The base 24 of the depression 23 is provided with an annular ring-shaped groove 25 which forms the outer rotary race for a series of bearings 26. A disc-like shaft contact member 27 is rotatably secured to the housing 22 by a pin 28 disposed along the axis of the disc 27. The disc 27 has an annular ring-shaped groove 29 which provides the inner race for the bearings 26. It is to be noted that the inner race 29 is formed concentrically inwardly of the outer race 25 relative to the axis 30 of the disc-like contact member 27.

Due to the oblique orientation of the depression 23, and hence of the axis 30 of the rotary disc-bearing element, the contact surface 31 contacts the perimeter 32 of the shaft 21 at a point 33 which is spaced from the axis 30. Therefore, as the shaft 21 moves longitudinally within the housing 22, a torque will be created from the point 33 about the axis 30 for rotating the disc-like contact member on the anti-friction bearing supports 26.

In FIGURE 1 three rotary disc-bearing elements, similar to the bearing element 20, are shown spaced approximately 120° apart for supporting linear motion of the shaft 21. This is the minimum number of such elements required to support a shaft of the type shown in FIGURE 1, although additional bearing elements may be employed either in the same plane as the three elements of FIGURE 1 or along the length of the shaft according to the loading requirements of the particular application.

The loading advantages of the rotary disc-bearing elements as shown in FIGURE 1 become apparent from a consideration of the radii of curvature of the moving components. In particular, the radii of curvature of the shaft contact member 27 at the surface 31 can be substantially larger than the radii of curvature of the bearings 26. Therefore, the stresses resulting at the contact point 33 between the disc 27 and the shaft 21 are substantially less than the contact stresses that would result from direct contact of the bearings 26 with the surface 32 of the shaft 21. The reduced contact stresses resulting from the use of the rotary disc bearing 20 allow the supporting of shafts which are soft enough to be machined thereby eliminating the need for additional heat treating of the shaft. In addition, the increased load capacity of the rotary disc-bearing element means that such elements are not required to be employed continuously along the length of the shaft. The result is that such bearings can accommodate substantial misalignment. Misaligned shafts supported substantially continuously along the surface thereof tend to bind the bearing elements and thereby increase the load on certain elements and decrease the longevity of the entire bearing support. Discrete bearing supports made possible by this invention substantially eliminate this misalignment problem.

The orientation of the rotary disc-bearing elements in the embodiment of FIGURE 1 permit only linear or longitudinal motions of the shaft 21. This is due to the fact that the axis 30 of the rotary disc 27 lies in a plane which is perpendicular to the axis of the shaft 21. In contrast the axis 34 of the rotary disc-bearing element 35, as shown in FIGURE 2, is disposed in a plane which contains the axis 36 of the shaft 37. Therefore, the contact point 38 between the disc 35 and the shaft 37 will be orientated relative to the axis 34 of the element 35, such that rotation of the shaft 37 in the direction indicated by the arrow 39 will produce rotation of the element 35 in the direction indicated by the arrow 40. However, since the axis of the rotary disc element 35 lies in the plane of the axis 36 of the shaft 37, longitudinal movement of the shaft 37, contacting the rotary disc at the point 38 will produce no moment about the axis 34 for accomplishing rotation of the disc 35.

The orientations of the axis of the rotary disc element in FIGURES 1 and 2 are extreme positions which produce wholly linear motion in FIGURE 1 and wholly rotary motion in FIGURE 2. However, the axis of the rotary disc bearing element may be orientated at all positions between the extremes to develop a combined linear and rotary motion for the associated shaft. In FIGURE 3 a disc shaft contact member 41 of a rotary disc bearing element is shown schematically relative to a movable shaft 42 having a centerline 43. The shaft 42 is mounted for rotation about the centerline or axis 43 and is mounted for longitudinal movement along the axis 43. The shaft is also mounted for a combination of rotational and longitudinal movement depending upon the orientation of the contact point at the surface of the shaft contact member 41. Should the rotary disc element be orientated about its axis such that the contact member 41 contacts the shaft 42 at a point 44, the shaft 42 will be mounted for wholly longitudinal movement. Longitudinal movement of the shaft 42 at the contact point 44 will develop a force L on the contact member 41 which has a moment arm B for developing a torque about the axis of the rotary element. In contrast, if the rotary disc element were orientated such that the contact point on the contact member 41 were at the point 45, the shaft 42 would be mounted only for rotational motion, since rotation of the shaft 42 would develop a force R having a moment arm A for producing a torque about a center of the contact member 41.

However, should the contact member 41 be orientated such that the contact point with the shaft 42 occurs at the point 46, both rotary and longitudinal movement of the shaft 42 would be possible, as the rotary motion of the shaft would develop a force R having a moment arm C for developing a torque about the center of the rotary bearing, and likewise longitudinal movement of the shaft 42 would develop a force L having a moment arm D for developing a torque about the axis of the element. It is apparent that all contact points between the extremes 44 and 45 are possible for varying degrees of rotary and longitudinal movement of the shaft 42. The contact points chosen in the vicinity of the point 44 would have predominantly longitudinal motion while contact points in the vicinity of the point 45 would be chosen for predominantly rotary motion.

An alternate embodiment of the surface contact member 27 is shown in FIGURE 4. In particular, the overall surface configuration of the contact member 27 is convex, while a concave groove 47 is formed about the axis 30 of the rotary bearing assembly 20. The concave groove cannot conform exactly to the shaft without generating an interference which would prevent rotation of the disc. The groove 47 is provided to conform with the surface 48 of the associated shaft 49 within the limits required to avoid interference. This configuration, therefore, provides an increased load carrying capacity for the rotary bearing element 20, as the contact area between the shaft contact disc 27 and the shaft 49 has been substantially increased over the point contact of FIGURE 1. It is apparent that a plurality of surface configurations may be developed for the surface contact disc 27 for varying the contact relationship between that disc and the associated shaft.

FIGURE 5 shows an alternate embodiment of the rotary disc bearing element of this invention and in particular shows a surface contact member 50 having an inner race 51 and a bearing retainer 52 having an outer race 53. The bearing retainer 52 is threaded as at 54 into the housing 55 surrounding the shaft 56. Orientation under load would be maintained by proper design of the ball races of members 50 and 52. FIGURES 1 thru 4 illustrate basic geometric relationships. FIGURE 5 illustrates an arrangement which would be much more manufacturable, by reason of having the race member 52 non-integral with the housing. The threads provide adjustable alignment and fit, as do the threads shown in FIGURES 7 and 10. Thread locking devices are not shown in these figures. However, a variety of types could be employed in FIGURES 1 2, and 4. The chief purpose of the pin 28 is to hold the bearing assembly together when there is no shaft present. It would generally be loosely fitted in the disc. Orientation under load would be provided by the design of the ball races. However, since radial loads are light, the pin could serve as a radial load carrying member as implied.

FIGURE 6 shows another alternate form of the rotary disc bearing element and in particular illustrates a means for adjustably loading the element relative to the associated shaft. In FIGURE 6 a shaft contact member 58 is formed independently of an inner race 59 and is threadedly received therein as at the point 60 to provide adjustable loading of the surface 61 against the surface 62 of the shaft 63. The contact member 58 has a shank portion 64 which extends outwardly within the housing 65 surrounding the shaft 63. The shank portion has an outer end 66 which comprises a standard fitting which may be adjusted by a suitable tool as is well understood. Rotation of the contact member 58 at the fitting 66 axially advances the surface 61 relative to the inner race 59 for increasing the loading at the surface 62 of the shaft 63. This in turn increases the loading on bearing members 67 which are disposed between the inner race 59 and the outer race 68 which is formed integrally with the housing 65.

To assure that a preset loading of the contact member 58 at the shaft 63 is maintained, a collet-type button shank 69 extends from the inner race 59 and a locking ring 70 is threadedly received as at a point 72 about the shank 69. By tightening the locking ring 70, finger-like members 73 on the shank 69 are compressed against the shank 64 of the contact member 58. The result is that the axial location of the contact member 58 within the inner race 59 is secured and cannot be disturbed by the longitudinal movement of the shaft 63.

In the embodiment of FIGURE 7 the contact member 74 is also formed independently of the inner race 75. However, the contact member 74 is not threaded within the inner race 75 but is maintained therein by the wedge-shaped configuration 76 of the member 74 and the complementary configuration 77 of the inner race 75. Also, a resilient layer 78 is disposed between the complementary surfaces 76 and 77 of the contact member 74 and the inner race 75 respectively. The presence of the resilient material 78 between the race 75 and the contact member 74 provides continuous adjustment or accommodation for variations in the alignment and configuration of the associated shaft 79. The resilient material may be bonded to the indicated members.

Unlike the bearing of FIGURE 6, the outer race 80 of FIGURE 7 is also formed independently of the principal housing 81. A retainer 82 is threadedly received within the housing at the point 83 and the outer race 80 is provided with a wedge-shaped configuration 84 which is substantially complementary with a similar configuration 85 of the retainer 82. As in the case of the contact member 74 the outer race 80 and the retainer 82 are separated by a layer 86 of resilient material for accommodating changes in the loading force on the bearing.

FIGURE 8 illustrates the extreme accommodation provided by the rotary disc bearing elements of this invention in that such elements may be used to provide a bearing support surface for curvilinear shafts such as an arcuately formed shaft 92. In FIGURE 8 a housing 87 supports an outer race 88 of a rotary disc bearing element 89. The rotary disc bearing element 89 has a series of bering members 90 and a button-shaped surface contact member 91, as explained in connection with the structure of FIGURE 1. It is to be noted in FIGURE 8 that the outer race 88 of the rotary bearing assembly is maintained against a shoulder 92 of the housing 87 by a pressure plate 93 which is mounted to the housing by a plurality of fasteners 94. This mounting of the rotary disc bearing assembly within the housing 87 assures that the assembly may be readily removed, replaced, or adjusted. The shaft 92 may be successfully carried by such a mounting because the bearing contact member 91 contacts the shaft at a discrete point and provides adequate loading without the use of additional supports which would retain the shaft configuration.

In FIGURE 9 a rotary bearing assembly is provided having a readily adjustable loading feature. In particular, a housing 96 which supports a shaft 95 is constructed in the form of a split ring having an adjustment gap 97. A bracket 96a slidably carries bearing housing 96 and has an adjustment gap 97a. A pin 98 is slidably received within a bore 99 and is threaded within a bore 99a and has a head 100 seated at a shoulder 101 formed within the bore 99. By tightening the head 100 of the pin 98 against the seat 101 the gap 97 is reduced and the rotary bearing assemblies 102, 103, and 104 are crimped about the shaft 95. Likewise, loosening the head 100 of the pin 98 increases the gap 97 in the housing 96 due to the inherent resiliency of the housing material and decreases thereby the loading of the bearing elements 102, 103, and 104 on the shaft 95.

FIGURES 10 and 11 illustrate that the rotary disc bearing elements of this invention may be employed in conjunction with various shaped movable members. In particular, a turntable 105 has angled walls 106 and 107 which provide bearing surfaces for the rotary disc bearing elements of this invention. The bearing housing consists of a flange block 108 which is secured by a series of bolts 109 to a principal frame or support 110. The flange block 108 has first and second arms 111 and 112 respectively which have rotary disc bearing elements 113 and 114 mounted therein. The rotary disc elements 113 and 114 are identical in construction to the rotary disc elements shown in FIGURE 5; the contact points 115 and 116 are chosen to provide the required movement of the surfaces 106 and 107 of the turntable 105.

It is apparent therefore, that the rotary disc bearing element of this invention is adaptable to a plurality of structures and may be utilized in different combinations to achieve selectable results. It is apparent also that the rotary disc bearing element is particularly suitable to being easily adjusted and mounted relative to a variety of shafts, rods, tables, or the like. It will be understood, therefore, that the embodiments illustrated in FIGURES 1 through 11 have been used for illustrative purposes only and that various modifications and variations in the structure shown may be effected without departing from the spirit and scope of the novel concepts of this invention.

I claim as my invention:

1. A linear motion bearing assembly comprising:
    a disc shaped contact member having a generally curved contact surface,
    said disc shaped contact member having a first rotary race formed at the opposite side of said generally curved contact surface,
    a support member having at least two rotary races formed therein,
    the axes of said two rotary races intersecting at an angel,
    one of said disc shaped contact members disposed within each of said two rotary races of said support member,
    a series of radial thrust bearing elements disposed between each of the rotary races of said disc shaped contact members and the associated rotary races of said support member,
    a shaft disposed against each of said disc shaped contact members and being mounted for free movement longitudinally thereof,
    the surface of said shaft and of said generally curved contact surface being mutually dissimilar such that only point contact is established between the two as the shaft moves longitudinally, and
    means holding said shaft uniformly in engagement with each of the contact surfaces of said contact member.

2. The combination of a housing and a shaft having a continuously curved cross section,
    a disc shaped contact member having a generally curved contact surface,
    said disc shaped contact member having a first rotary race formed at the opposite side of said generally curved contact surface,
    a plurality of rotary races formed within said housing, the axes of each of said rotary races intersecting at an angle with one another,
    one of said disc shaped contact members being disposed within each of said rotary races of said housing,
    a series of radial thrust bearing elements disposed between each of the rotary races of said disc shaped contact members and the associated rotary races of said housing, and said shaft being disposed against each of said disc shaped contact members, the surface of said shaft and of said generally curved contact surface being mutually dissimilar such that only point contact is established between the two and the shaft moves longitudinally.

3. A linear motion bearing assembly constructed in accordance with claim 1 wherein said generally curved surface of said disc-shaped contact member comprises a convex surface for making a point contact with said shaft at a region displaced from the axis of said contact member, and whereby rotary motion of said disc-shaped contact member permits substantially unresisted linear motion of a contacting shaft.

4. A linear motion bearing assembly constructed in accordance with claim 1 wherein said second rotary race is formed radially outwardly of said first rotary race, and whereby said disc-shaped contact member sustains radial as well as axial loading.

5. A linear motion bearing as described in claim 1 wherein said first rotary race is formed independently of said shaft contact member and wherein a layer of resilient material separates said shaft contact member and said first rotary race, and whereby imperfections in a shaft contacting said shaft contact member are accomodated by the compressibility of said resilient material.

6. A linear motion bearing as described in claim 1 wherein said first rotary race is formed independently of said shaft contact member and wherein said shaft contact member is axially adjustably mounted relative to said rotary races, and whereby surface deficiencies in the contacting shaft or in said contact member may be accommodated by axially advancing said contact member.

7. A linear motion bearing as described in claim 1 including a resilient means wherein said contact member is supported against a shaft by said resilient means to accommodate variation in the shaft-bearing contact.

8. A linear motion bearing as described in claim 5 wherein a ring groove is formed within said first rotary race, a layer of resilient material disposed along the profile of said groove and said contact member having a profile complementary formed to said groove and seated on said resilient layer, and whereby variations in the shaft-bearing contact are eliminated.

9. A linear motion bearing as described in claim 6 wherein said shaft contact member is threadedly received within said first rotary race and wherein a collet-type button shank is employed for locking the axial position of said contact member relative to said first rotary race.

10. The combination as described in claim 2 wherein said housing constitutes a split ring and wherein means are provided for adjustably tightening the ring to advance and retract said contact member relative to said shaft.

11. The combination as described in claim 10 wherein said shaft is curvilinear formed and wherein each of said bearing elements contacts said shaft at a single point thereon.

12. The combination as described in claim 2 wherein said shaft comprises a circular table-like structure having angled bearing surfaces and wherein said housing comprises a frame having a set of discrete flange blocks being cooperable with said bearing surfaces for supporting said shaft, said bearing elements being deployed within said flange blocks and having an oblique orientation relative to said bearing surfaces of said shaft.

References Cited

UNITED STATES PATENTS

| | | | |
|---|---|---|---|
| 867,283 | 11/1907 | Mann | 308—6 |
| 1,970,439 | 8/1934 | Townsend | 308—227 |
| 2,094,968 | 10/1937 | Searles | 308—235 X |
| 2,818,737 | 1/1958 | Barrett | 308—60 X |
| 3,132,904 | 5/1964 | Wakomatsu | 308—227 X |
| 1,911,485 | 5/1933 | Axlund. | |
| 2,023,796 | 12/1935 | Sorensen. | |

FOREIGN PATENTS

| | | |
|---|---|---|
| 632,469 | 12/1961 | Canada. |
| 649,218 | 8/1937 | Germany. |

EDGAR W. GEOHEGAN, *Primary Examiner.*

L. L. JOHNSON, *Assistant Examiner.*

U.S. Cl. X.R.

308—203, 207, 208, 15, 26, 184; 248—55